(No Model.)
J. J. SNIDER & W. H. O'BANNON.
STALK CUTTER.
No. 288,374. Patented Nov. 13, 1883.
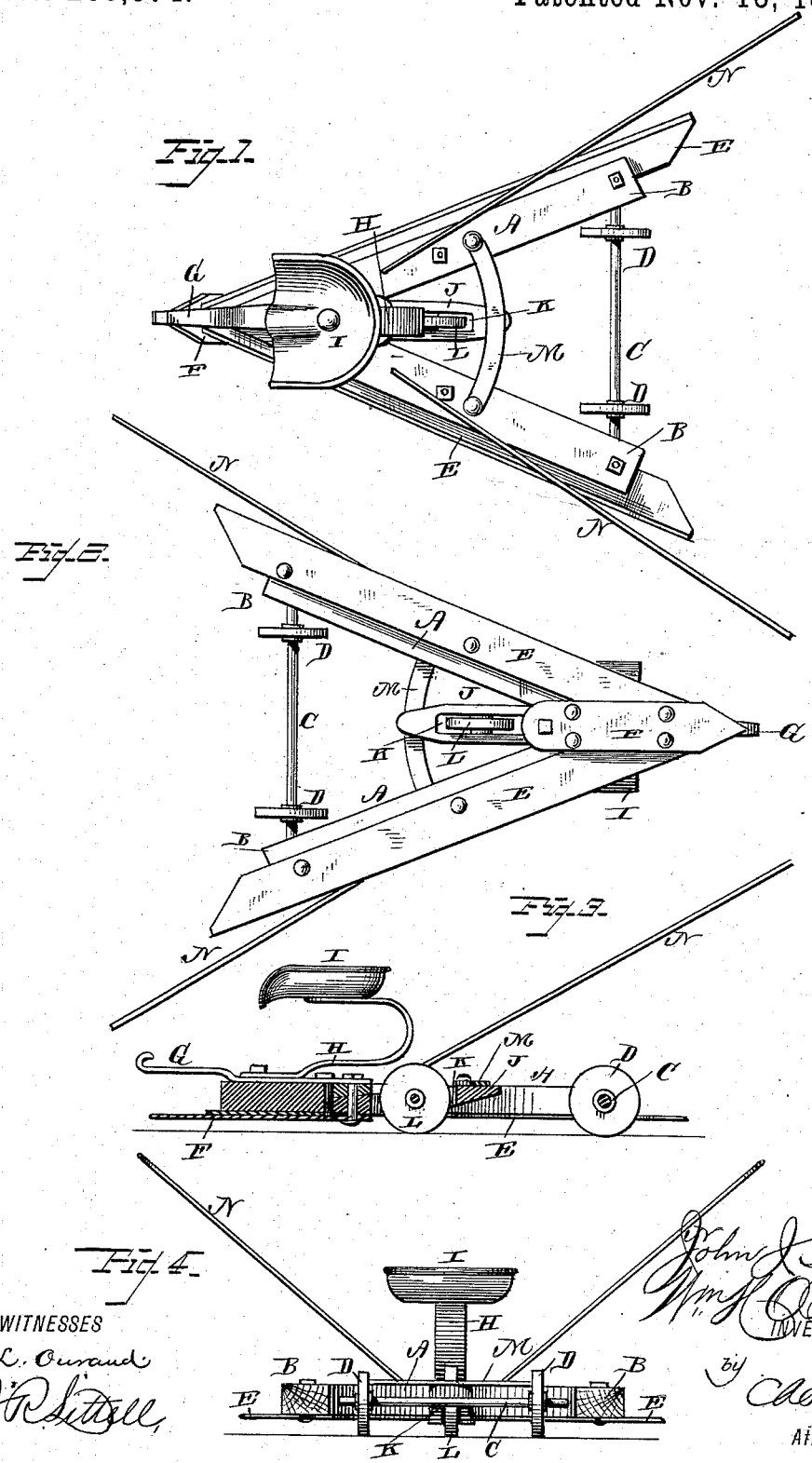

United States Patent Office.

JOHN J. SNIDER AND WILLIAM H. O'BANNON, OF CLEBURNE, TEXAS.

STALK-CUTTER.

SPECIFICATION forming part of Letters Patent No. 288,374, dated November 13, 1883.

Application filed July 27, 1883. (No model.)

*To all whom it may concern:*

Be it known that we, JOHN J. SNIDER and WILLIAM H. O'BANNON, citizens of the United States, residing at Cleburne, in the county of Johnson and State of Texas, have invented a new and useful Stalk-Cutter, of which the following is a specification, reference being had to the accompanying drawings.

This invention relates to stalk-cutters; and it has for its object to produce a machine which shall possess superior advantages in point of simplicity, durability, and general efficiency.

To this end it consists in certain improvements in the construction of the same, which will be hereinafter fully described, and particularly pointed out in the claims.

In the drawings hereto annexed, Figure 1 is a top view. Fig. 2 is a bottom view. Fig. 3 is a longitudinal vertical sectional view, and Fig. 4 is a rear view.

The same letters refer to the same parts in all the figures.

A in the drawings designates a V-shaped frame, composed of a pair of beams converging at the front end, as shown. The rear ends of the beams B B are provided with bearings for a shaft or axle, C, having a pair of wheels or rollers, D D.

E E are sharp-edged blades or cutters secured to the under sides of the beams B B, and projecting somewhat beyond the outer edges of the latter. Under the front ends of the cutters E E is bolted or otherwise secured a V-shaped pointed cutter, F, the edges of which project slightly beyond the cutting-edges of the blades E E, which will thus readily cut into the stalks when the machine is drawn over the field.

To the front end of the V-shaped frame A, on the upper side of the latter, is secured a draft-bar, G, and on top of the latter is secured a U-shaped spring-bar, H, carrying the seat I. The draft-bar G and the cutter F extend in rear of the converging point of the beams B B, forming the frame, and between them is pivoted a rearwardly-extending bar, J, having a slot, K, in which a wheel or caster, L, is journaled.

M is a curved brace connecting the beams B B, and the under side of which forms a bearing for the rear end of the swinging bar J.

N N are a pair of strong flexible rods, secured to the beams B B near the front ends of the latter, and extending from thence in an upward and rearward direction, and at the same time outwardly, so that their upper rear ends shall be some distance beyond the outer edges of the beams and cutters. The function of these rods will be to bend the stalks away from the machine, thus rendering them more easily severed, and preventing them, when cut, from falling over upon the machine, the progress of which might thereby be retarded.

From the foregoing description, taken in connection with the drawings hereto annexed, the operation and advantages of our invention will be readily understood. The wheels D D and L support the machine, raising the blades or cutters a short distance above the ground. When the machine is dragged over the field, the blades will cut the stalks close to the ground. The swinging front wheel, L, will greatly facilitate the turning of the machine. The general construction is simple, durable, and inexpensive.

We claim and desire to secure by Letters Patent of the United States—

In a stalk-cutter, the combination of the V-shaped frame, the side blades or cutters, the front cutter, arranged as described, and extending in rear of the converging point of the beams forming the frame, the draft-bar, arranged as described, and extending above the rear end of the front cutter, the slotted bar pivoted between the rear ends of the front cutter and draft-bar, the wheel journaled in the slot of said bar, the curved brace connecting the beams of the main frame and forming a bearing for the rear end of the swinging bar, and wheels or rollers supporting the rear end of the frame, substantially as set forth.

In testimony that we claim the foregoing as our own we have hereto affixed our signatures in presence of two witnesses.

JOHN J. SNIDER.
WILLIAM H. O'BANNON.

Witnesses:
J. W. IRVIN,
J. F. STROOP.